Figure 1:
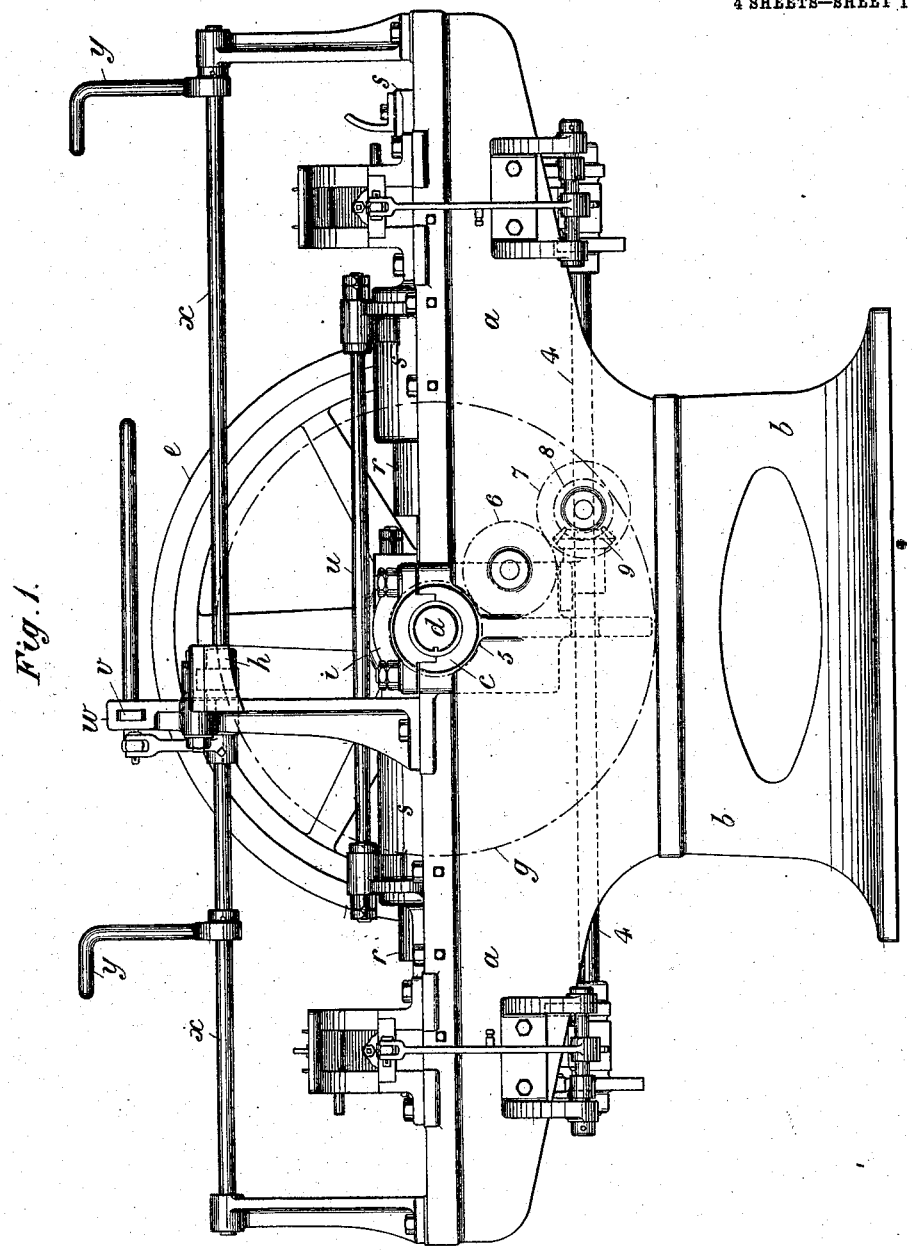

No. 867,093. PATENTED SEPT. 24, 1907.
T. R. BAYLISS.
POWER PRESS.
APPLICATION FILED AUG. 9, 1906.

4 SHEETS—SHEET 4.

Witnesses;—

Richard Skenett
Arthur J. Powell

Inventor;—

Thomas Richard Bayliss

UNITED STATES PATENT OFFICE.

THOMAS RICHARD BAYLISS, OF NORTHFIELD, NEAR BIRMINGHAM, ENGLAND.

POWER-PRESS.

No. 867,093.  Specification of Letters Patent.  Patented Sept. 24, 1907.

Application filed August 9, 1906. Serial No. 329,905.

*To all whom it may concern:*

Be it known that I, THOMAS RICHARD BAYLISS, a subject of the King of Great Britain, residing at "Belmont," Northfield, near Birmingham, England, have invented certain new and useful Improvements in Power-Presses, of which the following is a specification.

My invention consists of the improvements hereinafter described in power presses and other like machines, such for example as machines used in the drawing of metallic cartridge cases and other like metallic articles the said improvements having for their principal object to render the framing of the machine free or practically free from stress or strain due to the working of the machine and to admit of a much lighter construction of framing than is usual.

Figure 2:
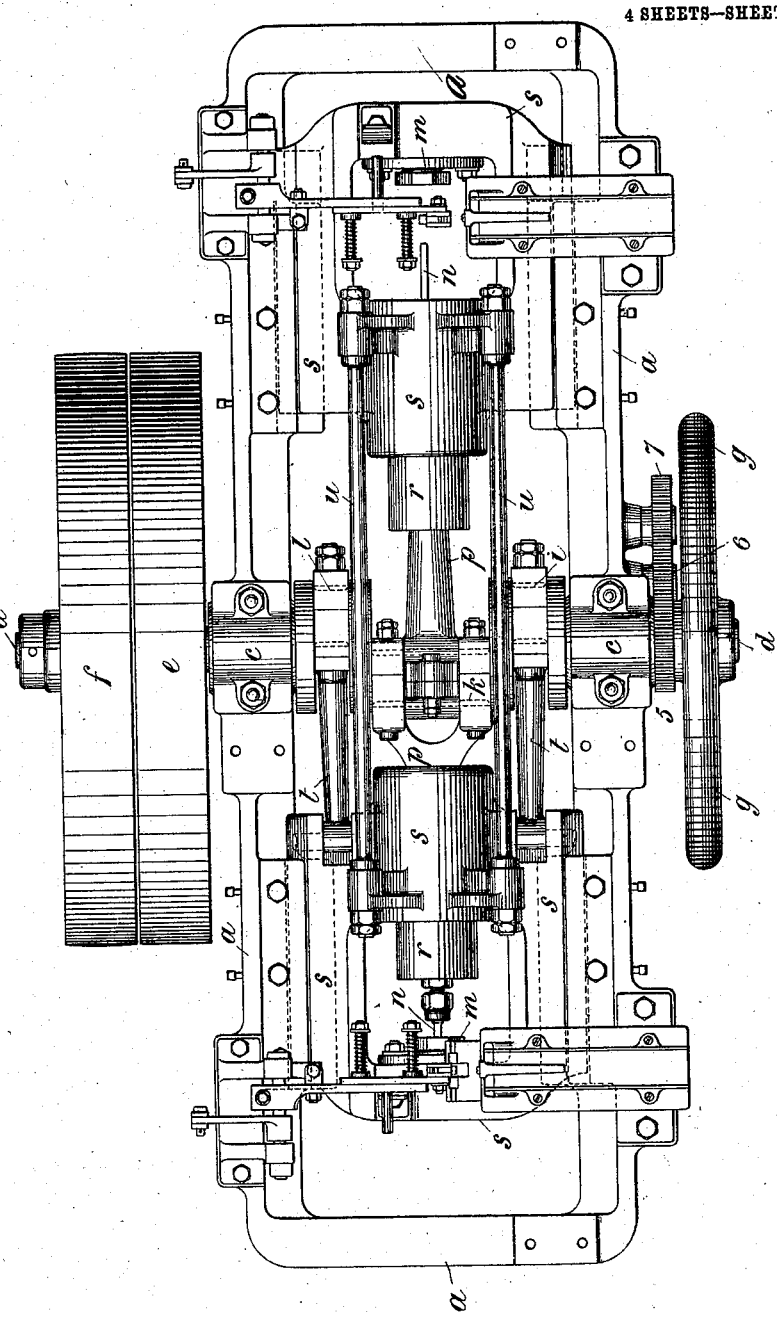
Figure 3:
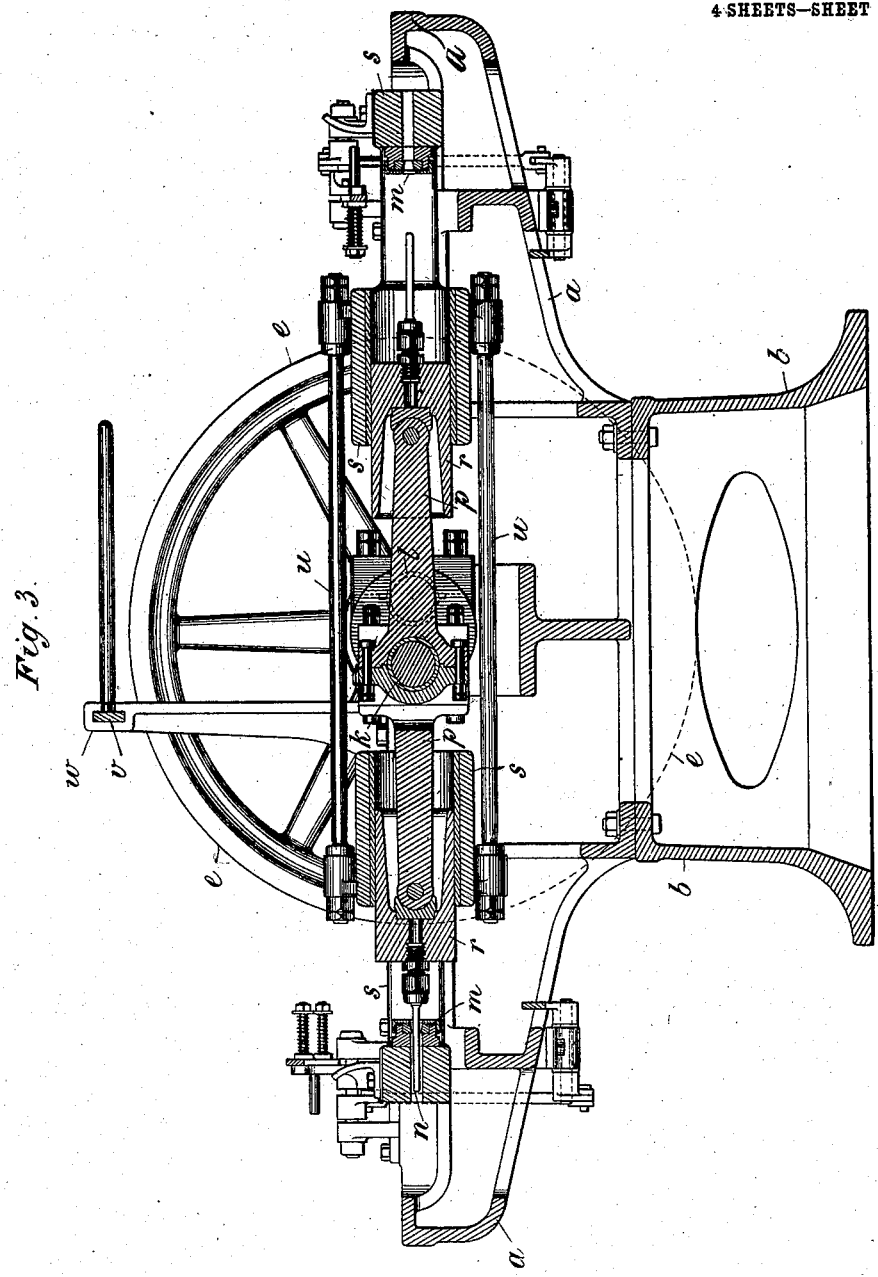

I will describe my invention in connection with a machine or press for the manufacture of metallic cartridge cases to which it is especially applicable reference being had to the accompanying drawings, Figure 1 of which represents in side elevation and Fig. 2 in plan a duplex or double ended power press or machine containing my improvements. Fig. 3 is a longitudinal section of the machine and Fig. 4 an end elevation of the same.

The same letters of reference indicate the same parts in the several figures of the drawings.

$a$ is the frame of the machine mounted on the base $b$ the said frame $a$ having at the middle of its opposite sides the bearings $c$, $c$ for the crank shaft $d$. The crank shaft has at one end the fast and loose belt pulleys $e$, $f$ respectively and at its other end the fly wheel $g$ (indicated in dotted lines only in Fig. 1) on the periphery of which the brake shoe $h$ of the brake hereinafter described is made to bear when the belt shifting mechanism is operated by the attendant for shifting the driving belt (not shown) from the fast pulley $e$ to the loose pulley $f$ of the machine.

The crank shaft $d$ has three cranks marked respectively $i$, $k$, $l$ (see Fig. 2) the two outer cranks $i$, $l$ being in alinement with or in the same plane as the middle crank $k$ but opposite in direction thereto. Attached to the middle crank $k$ are the oppositely directed connecting rods $p$, $p$ the outer ends of which are jointed to the rams $r$, $r$ which work in and are guided by the die slides $s$, $s$. To the rams $r$, $r$ the punches $n$, $n$ are fixed.

To the outer cranks $i$, $l$ the connecting rods $t$, $t$ are secured both of which are jointed at their outer ends to the same die slide $s$. The die slides $s$, $s$ at the two ends of the machine are connected by tie rods $u$, $u$, $u$, $u$ so that the reciprocating motion communicated to the one by the cranks $i$, $l$ and connecting rods $t$, $t$ is transmitted through the said tie rods $u$ to the other die slide $s$. To the die slides $s$, $s$ the dies $m$, $m$ are fixed but I wish it to be understood that the dies $m$, $m$ may be fixed to the rams $r$, $r$ and the punches $n$, $n$ to the slides $s$, $s$ with the same or nearly the same effect.

Figure 4:
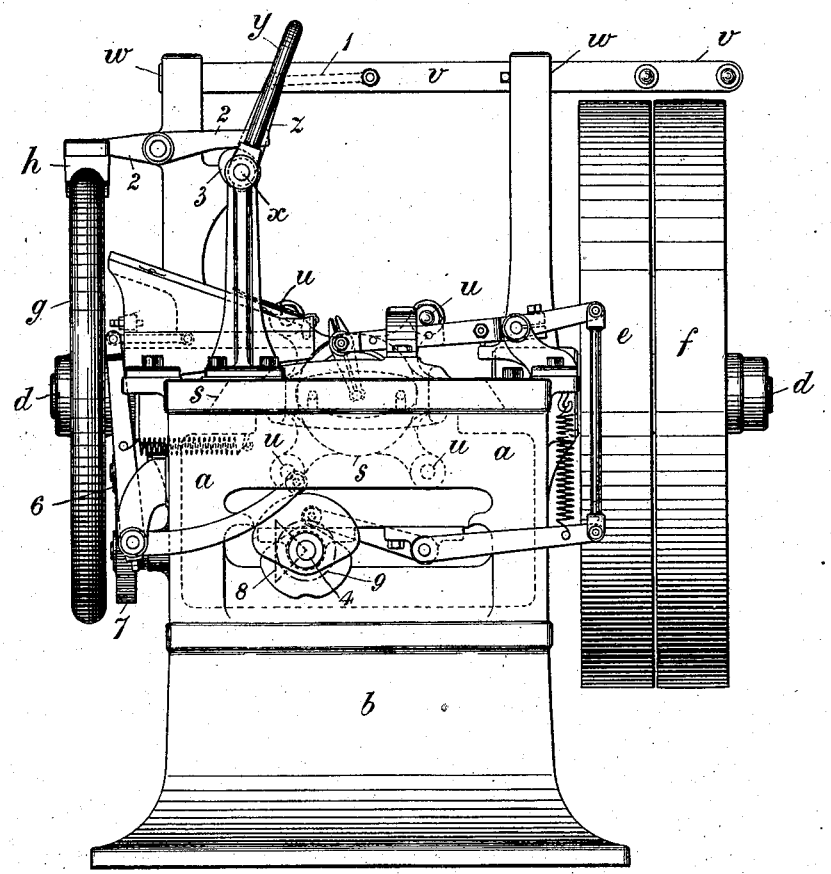

The belt shifting bar $v$ (omitted from the plan Fig. 2) crosses the machine from side to side and works when operated, in the guiding eyes $w$, $w$ (see Fig. 4). A sliding motion is communicated to the bar $v$ by the partial rotation of the shaft $x$ which has near each end a handle $y$ the partial rotary motion of the shaft $x$ giving to the belt shifting bar $v$ its sliding motion through the arm $z$ projecting from the shaft $x$ and link $l$ jointed to the end of the said arm $z$ and bar $v$ respectively. The brake shoe $h$ is fixed to one of the arms of the brake lever 2 the other arm of which rests on the cam 3 on the shaft $x$ the said cam 3 being so shaped that, when the shaft $x$ is partially rotated for transferring the driving belt from the fast pulley $e$ to the loose pulley $f$ the brake shoe $h$ is simultaneously brought to bear on the periphery or rim of the fly wheel $g$ and thereby brings the machine to rest.

The machine represented is provided at each end with mechanical cartridge case feeding mechanism of the ordinary kind that illustrated in connection with the machine being of the kind known as finger feed mechanism. The said mechanisms which I do not think it necessary to describe are driven from the feed shaft 4 which is rotated by the crank shaft $d$ through the spur wheels 5, 6, 7 and miter wheels 8, 9.

By the construction and arrangement of parts hereinbefore described and represented the punches $n$ and dies $m$ of the machine working in opposite directions and being operated by oppositely disposed cranks in the same plane when brought to their work effect no strain on the bearings or frame of the machine the strain being thrown wholly on the crank shaft, hence the frame of my improved power press or machine may be made much lighter than is usual. Further, by employing a pair of cranks each having one half the throw of the single crank employed in the ordinary machine the improved machine is made more effective in action and can be worked with less expenditure of power.

Where the power press or machine is arranged vertically instead of horizontally it is made single acting, that is to say, it is provided with a die and punch at its lower end only.

The application of my invention to power presses or machines other than metallic cartridge case making machines differs in no essential respect from its application to a metallic cartridge case making machine as is hereinbefore described and represented.

Having described my invention what I claim as new and desire to secure by Letters Patent is:—

1. A power press of the class described involving a base, a frame supported thereon and having bearings, a crank shaft mounted in said bearings and having three cranks between the latter, the two outer cranks being disposed on the opposite side of the axis of the crank shaft to that of the intermediate crank, the axes of the three cranks and axis of the crank shaft being all in one plane, a rod connected to each of the outer cranks, a pair of rods connected with the intermediate crank, the last named rods being disposed in opposite directions, rams connected with the oppositely disposed connecting rod of the intermediate crank, a die-slide near one end of the machine and connected with the rods of the outer cranks, a second die-slide, and tie-rods for connecting the die-slides with each other to cause the same to move simultaneously and in opposite directions to the rams.

2. A power press of the class described involving a base, a frame supported thereon and having bearings, a crank shaft mounted in the bearings, said crank shaft having three cranks between the bearings, the two outer cranks being disposed on the opposite side of the axis of the crank shaft to that of the middle crank, the axes of the three cranks and axis of the crank shaft being in one plane, rods connected to the outer cranks, a pair of rods connected to the middle crank, the last named rods being disposed in opposite directions, rams actuated by the rods connected to the middle crank, a die-slide associated with the outer rods and actuated thereby, a second die-slide, tie-rods for connecting the respective die-slides so that the same move simultaneously, said die-slides movable in an opposite direction with respect to the movement of the rams, a fly-wheel carried by the crank shaft at one end thereof, fixed and loose belt pulleys mounted at the other end of the crank shaft, and means for shifting a belt from one pulley to the other.

3. A power press of the class described involving a base, a frame supported thereby and having bearings, a crank shaft mounted in the bearings, said crank shaft having three cranks between its bearings, the two outer cranks being disposed on the opposite side of the axis of the crank shaft to that of the middle crank, the axes of the three cranks and axis of the crank shaft being in one plane, rods connected to the respective cranks, rams connected to the middle rods, a die-slide associated with the outer rods and actuated thereby, a second die-slide, tie-rods for connecting the respective die-slides so that the same move simultaneously, said die-slides movable in an opposite direction with respect to the movement of the cranks, a fly-wheel carried by the crank shaft at one end thereof, fixed and loose belt pulleys mounted at the other end of the crank shaft, means for shifting a belt from one pulley to the other, and brake mechanism coöperative with the fly-wheel.

In testimony whereof I have hereunto set my hand in presence of two subscribing witnesses.

THOMAS RICHARD BAYLISS.

Witnesses:
RICHARD SKERRETT,
ARTHUR J. POWELL.